(12) United States Patent
Taherzadeh Boroujeni et al.

(10) Patent No.: US 11,750,260 B2
(45) Date of Patent: Sep. 5, 2023

(54) NON-UNIFORM QUANTIZED FEEDBACK IN FEDERATED LEARNING

(71) Applicant: QUALCOMM Incorporated, San Diego, CA (US)

(72) Inventors: Mahmoud Taherzadeh Boroujeni, San Diego, CA (US); Tao Luo, San Diego, CA (US); Taesang Yoo, San Diego, CA (US); Hamed Pezeshki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 17/448,226

(22) Filed: Sep. 21, 2021

(65) Prior Publication Data

US 2022/0103221 A1 Mar. 31, 2022

Related U.S. Application Data

(60) Provisional application No. 63/085,743, filed on Sep. 30, 2020.

(51) Int. Cl.
*H04B 7/06* (2006.01)
*H04L 25/03* (2006.01)
*H04L 25/02* (2006.01)

(52) U.S. Cl.
CPC ....... *H04B 7/0634* (2013.01); *H04L 25/0254* (2013.01); *H04L 25/03267* (2013.01)

(58) Field of Classification Search
CPC ............ G06N 3/04; G06N 3/08; G06N 3/063; G06N 3/0454; G06N 20/00; G06N 20/10; H04B 7/06; H04B 7/0456; H04B 7/0634; H04L 5/00; H04L 25/02; H04L 25/03; H04L 25/0254; H04L 25/03267; H04L 29/06; H04L 67/42; H04W 8/22; H04W 24/10; H04W 72/04; H04W 72/12; H04W 80/02
USPC .......................... 375/219, 260, 267, 295, 316
See application file for complete search history.

(56) References Cited

U.S. PATENT DOCUMENTS

2017/0288695 A1* 10/2017 Feng .................. H03M 7/50
2020/0257668 A1* 8/2020 Wu .................. G06F 16/248
2021/0351885 A1* 11/2021 Chavva .................. G06N 3/04

OTHER PUBLICATIONS

S. Horvath, "Natural Compression for Distributed Deep Learning" Feb. 13, 2020 (Year: 2020).*
Amiri M.M., et al., "Federated Learning with Quantized Global Model Updates," arXiv:2006.10672v1 [cs.IT], Jun. 18, 2020, 15 pages.

(Continued)

*Primary Examiner* — Shawkat M Ali
(74) *Attorney, Agent, or Firm* — Harrity & Harrity, LLP

(57) ABSTRACT

Various aspects of the present disclosure generally relate to wireless communication. In some aspects, a client device may determine a feedback associated with a machine learning component based at least in part on applying the machine learning component. Accordingly, the client device may transmit a quantized value based at least in part on the feedback. The quantized value is determined based at least in part on distances between the feedback and a non-uniform set of quantized digits. Numerous other aspects are provided.

30 Claims, 9 Drawing Sheets

(56) References Cited

OTHER PUBLICATIONS

Akyol E., et al., "On Constrained Randomized Quantization", IEEE Transactions on Signal Processing, IEEE, USA, vol. 61, No. 13, Jul. 1, 2013, pp. 3291-3302, XP011514119, ISSN: 1053-587X, DOI: 10.1109/TSP.2013.2261296 p. 1-p. 3.
International Search Report and Written Opinion—PCT/US2021/071546—ISA/EPO—dated Feb. 11, 2022.
Suresh A.T., et al., "Distributed Mean Estimation with Limited Communication", Sep. 25, 2017, XP055880484, 17 Pages, Abstract, Figures 2,3 1. Introduction 7. Practical Considerations and Applications.
Amiri M.M., et al., "Federated Learning with Quantized Global Model Updates," arXiv:2006.10672v1 [cs.IT], Cornell University Library, 201 OLIN Library Cornell University Ithaca, NY 14853, Jun. 18, 2020 (Jun. 18, 2020), XP081698697, 15 pages, Abstract 1. Introduction.
Xiao J-J., et al., "Distributed Compression-Estimation Using Wireless Sensor Networks," IEEE Signal Processing Magazine, Jul. 2006, pp. 27-41.

\* cited by examiner

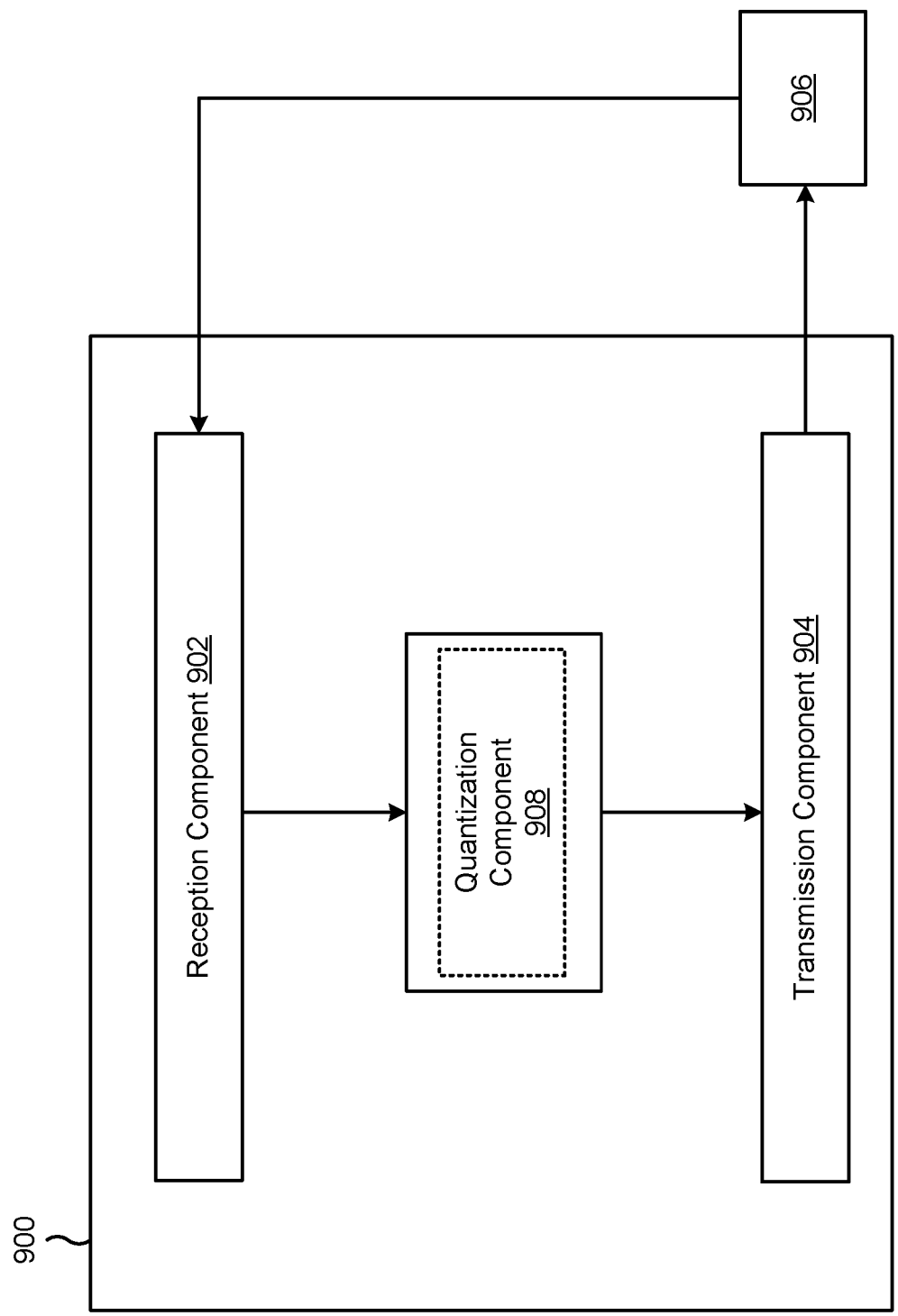

NON-UNIFORM QUANTIZED FEEDBACK IN FEDERATED LEARNING

CROSS-REFERENCE TO RELATED APPLICATION

This patent application claims priority to U.S. Provisional Patent Application No. 63/085,743, filed on Sep. 30, 2020, entitled "NON-UNIFORM QUANTIZED FEEDBACK IN FEDERATED LEARNING," and assigned to the assignee hereof. The disclosure of the prior application is considered part of and is incorporated by reference in this patent application.

FIELD OF THE DISCLOSURE

Aspects of the present disclosure generally relate to wireless communication and to techniques and apparatuses for transmitting and receiving non-uniform quantized feedback in federated learning.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a client device. The method may include determining a feedback associated with a machine learning component based at least in part on applying the machine learning component. The method may further include transmitting a quantized value based at least in part on the feedback, wherein the quantized value is determined based at least in part on distances between the feedback and a non-uniform set of quantized digits.

Some aspects described herein relate to a method of wireless communication performed by a server device. The method may include transmitting, to a client device, a configuration associated with a machine learning component, wherein the machine learning component accepts one or more inputs to generate one or more outputs. The method may further include receiving a quantized value based at least in part on feedback from the client device having applied the machine learning component, wherein the quantized value is based at least in part on distances between the feedback and a non-uniform set of quantized digits.

Some aspects described herein relate to an apparatus for wireless communication at a client device. The client device may include a memory and one or more processors coupled to the memory. The one or more processors may be configured to determine a feedback associated with a machine learning component based at least in part on applying the machine learning component. The one or more processors may be further configured to transmit a quantized value based at least in part on the feedback, wherein the quantized value is determined based at least in part on distances between the feedback and a non-uniform set of quantized digits.

Some aspects described herein relate to an apparatus for wireless communication at a server device. The server device may include a memory and one or more processors coupled to the memory. The one or more processors may be configured to transmit, to a client device, a configuration associated with a machine learning component, wherein the machine learning component accepts one or more inputs to generate one or more outputs. The one or more processors may be further configured to receive a quantized value based at least in part on feedback from the client device having applied the machine learning component, wherein the quantized value is based at least in part on distances between the feedback and a non-uniform set of quantized digits.

Some aspects described herein relate to a non-transitory computer-readable medium storing a set of instructions for wireless communication. The one or more instructions, when executed by one or more processors of a client device, may cause the client device to determine a feedback associated with a machine learning component based at least in part on applying the machine learning component. The one or more instructions, when executed by one or more processors of a client device, may further cause the client device to transmit a quantized value based at least in part on the feedback, wherein the quantized value is determined based at least in part on distances between the feedback and a non-uniform set of quantized digits.

Some aspects described herein relate to a non-transitory computer-readable medium storing a set of instructions for wireless communication. The one or more instructions, when executed by one or more processors of a server device, may cause the server device to transmit, to a client device, a configuration associated with a machine learning component, wherein the machine learning component accepts one or more inputs to generate one or more outputs. The one or more instructions, when executed by one or more processors of a server device, may further cause the server device to receive a quantized value based at least in part on feedback from the client device having applied the machine learning component, wherein the quantized value is based at least in part on distances between the feedback and a non-uniform set of quantized digits.

Some aspects described herein relate to an apparatus for wireless communication. The apparatus may include means for determining a feedback associated with a machine learning component based at least in part on applying the machine learning component. The apparatus may further include means for transmitting a quantized value based at least in part on the feedback, wherein the quantized value is determined based at least in part on distances between the feedback and a non-uniform set of quantized digits.

Some aspects described herein relate to an apparatus for wireless communication. The apparatus may include means for transmitting, to a client device, a configuration associated with a machine learning component, wherein the machine learning component accepts one or more inputs to generate one or more outputs. The apparatus may further include means for receiving a quantized value based at least in part on feedback from the client device having applied the machine learning component, wherein the quantized value is based at least in part on distances between the feedback and a non-uniform set of quantized digits.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 8 and 9 are diagrams of example apparatuses for wireless communication, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
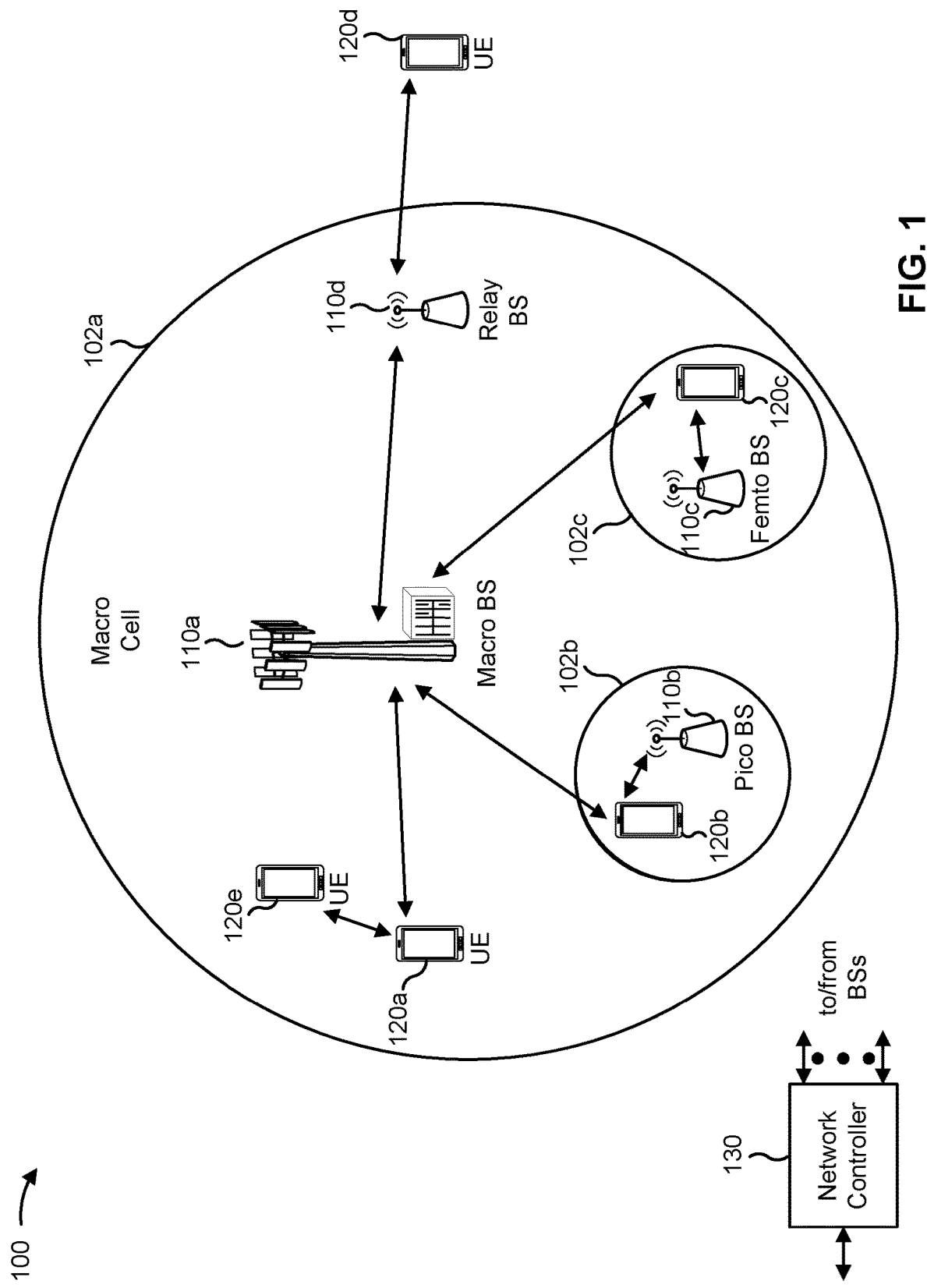
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
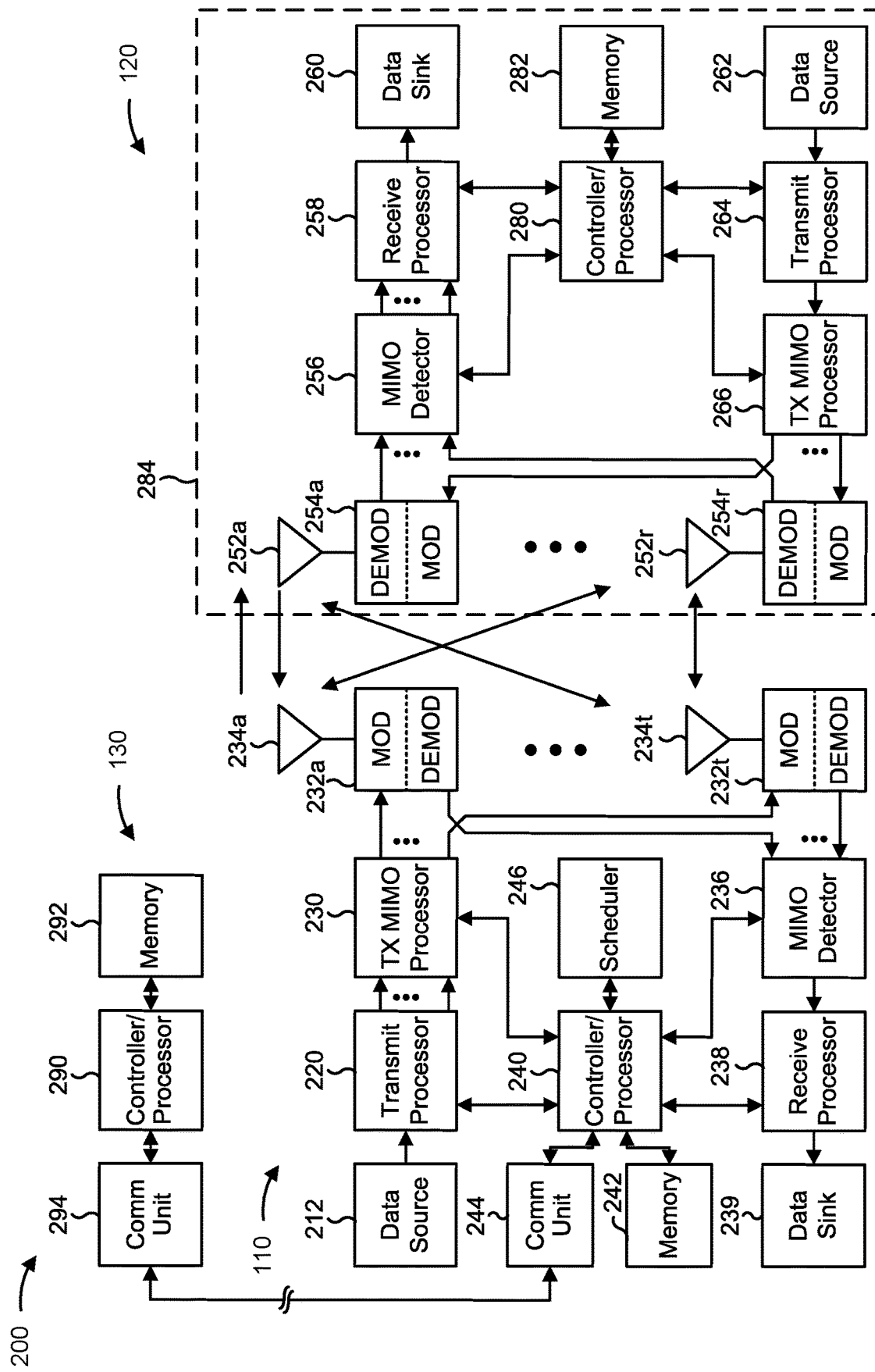
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-9).

The controller/processor 240 of the base station 110, the controller/processor 280 of the UE 120, and/or any other component(s) of FIG. 2 may perform one or more techniques associated with transmitting and receiving quantized feedback in federated learning with randomization, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples. In some aspects, the server device described herein is the base station 110, is included in the base station 110, or includes one or more components of the base station 110 shown in FIG. 2. In some aspects, the client device described herein is the UE 120, is included in the UE 120, or includes one or more components of the UE 120 shown in FIG. 2.

In some aspects, a client device (e.g., UE 120, apparatus 800 of FIG. 8, and/or another client device, such as a tablet, a laptop, or a desktop computer, among other examples) may include means for determining a feedback associated with a machine learning component based at least in part on applying the machine learning component; and/or means for transmitting a quantized value based at least in part on the feedback, wherein the quantized value is determined based at least in part on distances between the feedback and a non-uniform set of quantized digits. In some aspects, the means for the client device to perform operations described herein may include, for example, one or more of antenna 252, modem 254, MIMO detector 256, receive processor 258, transmit processor 264, TX MIMO processor 266, controller/processor 280, or memory 282.

In some aspects, a server device (e.g., base station 110, apparatus 900 of FIG. 9, and/or another server device, such as one or more server computers in a server farm and/or at least a portion of a core network supporting base station 110) may include means for transmitting, to a client device (e.g., UE 120, apparatus 800 of FIG. 8, and/or another client device, such as a tablet, a laptop, or a desktop computer, among other examples), a configuration associated with a machine learning component, wherein the machine learning component accepts one or more inputs to generate one or more outputs; and/or means for receiving a quantized value based at least in part on feedback from the client device having applied the machine learning component, wherein the quantized value is based at least in part on distances between the feedback and a non-uniform set of quantized digits. In some aspects, the means for the server device to perform operations described herein may include, for example, one or more of transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
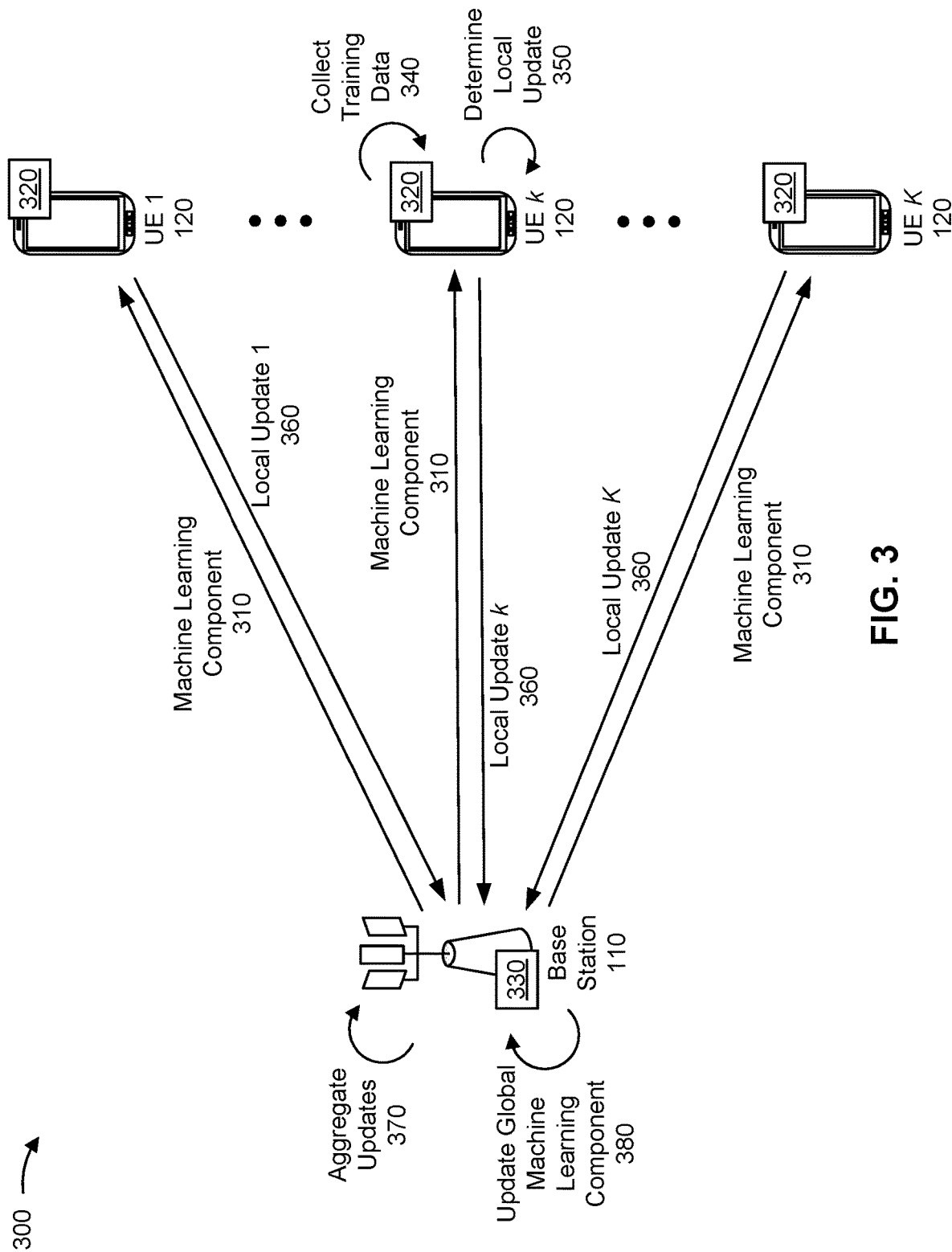
FIG. 3 is a diagram illustrating an example of federated learning for machine learning components, in accordance with the present disclosure.

FIG. 3 is a diagram illustrating an example 300 of federated learning for machine learning components, in accordance with the present disclosure. As shown, a base station 110 may communicate with a set of UEs 120 (shown as "UE 1, . . . UE k, . . . , and UE K"). The base station 110 and the UEs 120 may communicate with one another via a wireless network (e.g., the wireless network 100 shown in FIG. 1). In some aspects, any number of additional UEs 120 may be included in the set of K UEs 120.

A machine learning component is a component (e.g., hardware, software, or a combination thereof) of a device (e.g., a client device, a server device, a UE, a base station) that performs one or more machine learning procedures. A machine learning component may include, for example, hardware and/or software that may learn to perform a procedure without being explicitly trained to perform the procedure. A machine learning component may include, for example, a feature learning processing block and/or a representation learning processing block. A machine learning component may include one or more neural networks. A neural network may include, for example, an autoencoder.

As shown in example 300, machine learning components may be trained using federated learning. Federated learning is a machine learning technique that enables multiple clients (e.g., UEs 120) to collaboratively train machine learning models based on training data, while the server device (e.g., base station 110) does not collect the training data from the client devices. Federated learning techniques may involve one or more global neural network models trained from data stored on multiple client devices (e.g., as described in further detail below).

As shown by reference number 310, the base station 110 may transmit a machine learning component to the UEs 120. As shown, the UEs 120 may each include a first communication manager 320. The first communication manager 320 may be configured to utilize the machine learning component to perform one or more wireless communication tasks and/or one or more user interface tasks. The first communication manager 320 may be configured to utilize any number of additional machine learning components.

As shown in FIG. 3, the base station 110 may include a second communication manager 330. The second communication manager 330 may be configured to utilize a global machine learning component to perform one or more wireless communication tasks, to perform one or more user interface tasks, and/or to facilitate federated learning associated with the machine learning component.

The UEs 120 may each locally train the machine learning component using training data collected by the UEs 120, respectively. Each UE 120 may train a machine learning component, such as a neural network, by optimizing a set of model parameters (e.g., represented by $w^{(n)}$) associated with the machine learning component (where n represents a federated learning round index, as described below). The set of UEs 120 may each be configured to provide updates to the base station 110 multiple times (e.g., periodically, on demand, and/or upon updating a local machine learning component).

A federated learning round refers to the training done by a UE 120 that corresponds to (e.g., precedes) an update provided by the UE 120 to the base station 110. In some aspects, the federated learning round may include the transmission by a UE 120, and the reception by the base station 110, of an update. The federated learning round index (e.g., represented by n) indicates the number of the rounds since the most recent global update was transmitted by the base station 110 to the UE 120. The initial provisioning of a machine learning component on a UE 120 and/or the transmission of a global update to the machine learning component to a UE 120, among other examples, may trigger the beginning of a new round of federated learning.

In some aspects, for example, the first communication manager 320 of a UE 120 may determine an update corresponding to the machine learning component by training the machine learning component. An update may include any updated information, determined based at least in part on a training procedure associated with the machine learning component. An update may include, for example, an updated machine learning component (e.g., an updated neural network model), a set of updated parameters (e.g., a set of updated weights of a neural network), a set of gradients associated with a loss function of the machine learning component, and/or a compressed update, among other examples. In some aspects, as shown by reference number 340, each of the UEs 120 may collect training data and store the training data in a memory device. The stored training data may be referred to as a "local dataset." As shown by reference number 350, each of the UEs 120 may determine a local update associated with the machine learning component.

In some aspects, for example, the first communication manager 320 may access training data from the memory device and use the training data to determine an input vector (e.g., represented by $x_j$) to be input into the machine learning component to generate a training output (e.g., represented by $y_j$) from the machine learning component. The input vector $x_j$ may include an array of input values, and the training output $y_j$ may include a value (e.g., a value between 0 and 9).

The training output $y_j$ may be used to facilitate determining the model parameters $w^{(n)}$ that maximize a variational lower bound function. A negative variational lower bound function, which is the negative of the variational lower bound function, may correspond to a local loss function (e.g., represented by $F_k(w)$) which may be expressed in a form similar to:

$$F_k(w) = \frac{1}{|D_k|} \sum_{(x_j, y_j) \in D_k} f(w, x_j, y_j),$$

where $D_k$ represents the size of the local dataset associated with the UE k. A stochastic gradient descent (SGD) algorithm may be used to optimize the model parameters $w^{(n)}$. The first communication manager 320 of a UE 120 may perform one or more SGD procedures to determine the optimized parameters $w^{(n)}$ and may determine the gradients (e.g., represented by $g_k^{(n)} = \nabla F_k(w^{(n)})$) of the loss function F(w). The first communication manager 320 may further refine the machine learning component based at least in part on the loss function value and/or the gradients, among other examples.

By repeating this process of training the machine learning component to determine the gradients $g_k^{(n)}$ a number of times, the first communication manager 320 may determine an update corresponding to the machine learning component. Each repetition of the training procedure described above may be referred to as an epoch. In some aspects, the update may include an updated set of model parameters $w^{(n)}$, a difference between the updated set of model parameters $w^{(n)}$ and a prior set of model parameters $w^{(n-1)}$, the set of gradients $g_k^{(n)}$, and/or an updated machine learning component (e.g., an updated neural network model), among other examples.

As shown by reference number 360, the UEs 120 may each transmit their respective local updates (shown as "local update 1, . . . , local update k, . . . , local update K"). In some aspects, a local update may include a compressed version of a local update. For example, in some aspects, a UE 120 may transmit a compressed set of gradients (e.g., represented by $\tilde{g}_k^{(n)} = q(g_k^{(n)})$), where q represents a compression scheme applied to the set of gradients $g_k^{(n)}$).

As shown by reference number 370, the base station 110 (e.g., using the second communication manager 330) may aggregate the updates received from the UEs 120. For example, the second communication manager 330 may average the received gradients to determine an aggregated update, which may be expressed in a form similar to:

$$g^{(n)} = \frac{1}{K} \sum_{k=1}^{K} \tilde{g}_k^{(n)},$$

where, as explained above, K represents the total quantity of UEs 120 from which updates were received. In some examples, the second communication manager 330 may aggregate the received updates using other aggregation techniques. As shown by reference number 380, the second communication manager 330 may update the global machine learning component based on the aggregated updates. In some aspects, for example, the second communication manager 330 may update the global machine learning component by normalizing the local datasets by treating each dataset size (e.g., represented by $D_k$) as being equal. The second communication manager 330 may update the global machine learning component using multiple rounds of updates from the UEs 120 until a global loss function is minimized. The global loss function may be given, for example, according to form similar to:

$$F(w) = \frac{\sum_{k=1}^{K} \sum_{j \in D_k} f_j(w)}{K * D} = \frac{1}{K} \sum_{k=1}^{K} F_k(w),$$

where $D_k = D$, and where D represents a normalized constant. In some aspects, the base station 110 may transmit an update associated with the updated global machine learning component to the UEs 120.

The UEs 120 may use the machine learning component for any number of different types of operations, transmissions, and/or user experience enhancements, among other examples. In some aspects, the UEs 120 may use one or more machine learning components to report information to a base station associated with received signals, user interactions with the UEs 120, and/or positioning information, among other examples. In some aspects, the UEs 120 may perform measurements associated with reference signals and use one or more machine learning component to facilitate reporting the measurements to a base station. For example, the UEs 120 may measure reference signals during a beam management process for channel state feedback (CSF), may measure received power of reference signals from a serving cell and/or neighbor cells, may measure signal strength of inter-radio access technology (e.g., WiFi) networks, and/or may measure sensor signals for detecting locations of one or more objects within an environment, among other examples. In some aspects, the UEs 120 may use one or more machine learning components to use data associated with a user's interaction with the UEs 120 to customize or otherwise enhance a user experience with a user interface.

The exchange of information in this type of federated learning is often done over WiFi connections, where limited and/or costly communication resources are not of concern due to wired connections associated with modems, routers, and other hardware. However, implementing federated learning for machine learning components in the cellular context can enable positive impacts in network performance and user experience.

In some situations, in federated learning, a UE may use significant network overhead and power to transmit an update to a base station. Accordingly, to reduce overhead, the UE may quantize the update and transmit the quantized update to the base station. This quantization may be applied to vectors (e.g., gradients $g_k^{(n)}$ as described above) and/or scalars (e.g., updated weights for machine learning components). However, quantization often introduces a large error that increases as a number of UEs used for the federated learning increases. For example, if a plurality of UEs calculate a scalar of 0.75 as an update, and quantize the scalar to 0.0 when quantizing to the nearest even digit, the base station may receive a plurality of updates that indicate a quantized scalar of 0.0 from the UEs, which has a relatively large error.

Some techniques and apparatuses described herein provide for more accurate quantization of updates for federated machine learning of learning components. In some aspects, a client device (e.g., UE 120) may determine feedback using a machine learning component from a server device (e.g., base station 110). For example, the UE 120 may locally train the machine learning component to determine a local update associated with the machine learning component. The UE 120 may quantize the feedback using a non-uniform set of quantized digits. Accordingly, the base station 110 more accurately aggregates feedback from a plurality of UEs including the UE 120. For example, if a plurality of UEs calculate a scalar of 0.75 as an update, the base station 110 receives a plurality of updates that indicate a quantized scalar of 1.0 from the UEs, when the UEs quantize to the nearest even digit or 1.0, which is non-uniform. As a result, network performance is improved by using quantization during federated learning without incurring significant loss of accuracy during the federated learning.

As indicated above, FIG. 3 is provided merely as an example. Other examples may differ from what is described with regard to FIG. 3.

Figure 4:
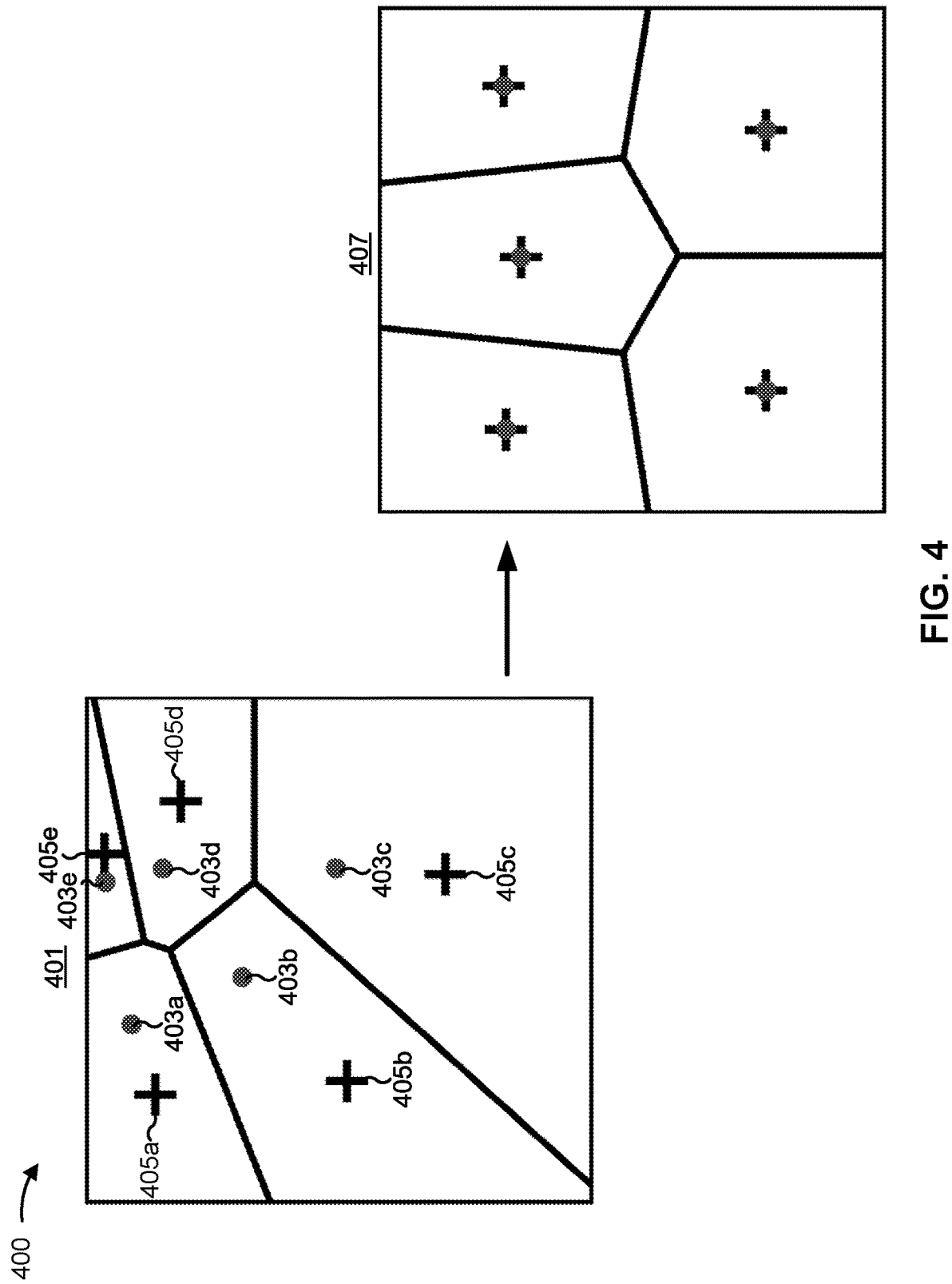
FIG. 4 is a diagram illustrating an example associated with non-uniform quantization, in accordance with the present disclosure.

FIG. 4 is a diagram illustrating an example 400 of non-uniform quantization, in accordance with the present disclosure. In example 400, a client device (such as a UE 120 and/or another client device, such as tablet, a laptop, or a desktop computer) may apply a Lloyd algorithm to apply non-uniform quantization.

As shown in FIG. 4, the client device may a determine a Voronoi diagram 401 based at least in part on a set of points (e.g., updates from federated learning, as described in connection with FIG. 3), shown as dots 403a, 403b, 403c, 403d, and 403e in FIG. 4. The Voronoi diagram 401 may include a plurality of regions, where each region includes all points closer to a corresponding one of the set of points than to any other of the set of points.

In some aspects, the client device may further determine a centroid of each region (shown as crosses 405a, 405b, 405c, 405d, and 405e) and then re-partition the space into regions to generate a new Voronoi diagram 407 based at least in part on the centroids. The client device may perform these determinations iteratively for a preconfigured number of iterations and/or until the centroids satisfy one or more thresholds. For example, the client device may end the quantization when the centroids from one iteration each individually or together collectively are within a threshold distance of the centroids from a next iteration. Although the description herein focuses on two-dimensional space, the description similarly applies to higher-ordered spaces, such as three-dimensional space, four-dimensional space, and so on.

As indicated above, FIG. 4 is provided merely as an example. Other examples may differ from what is described with regard to FIG. 4.

Figure 5:
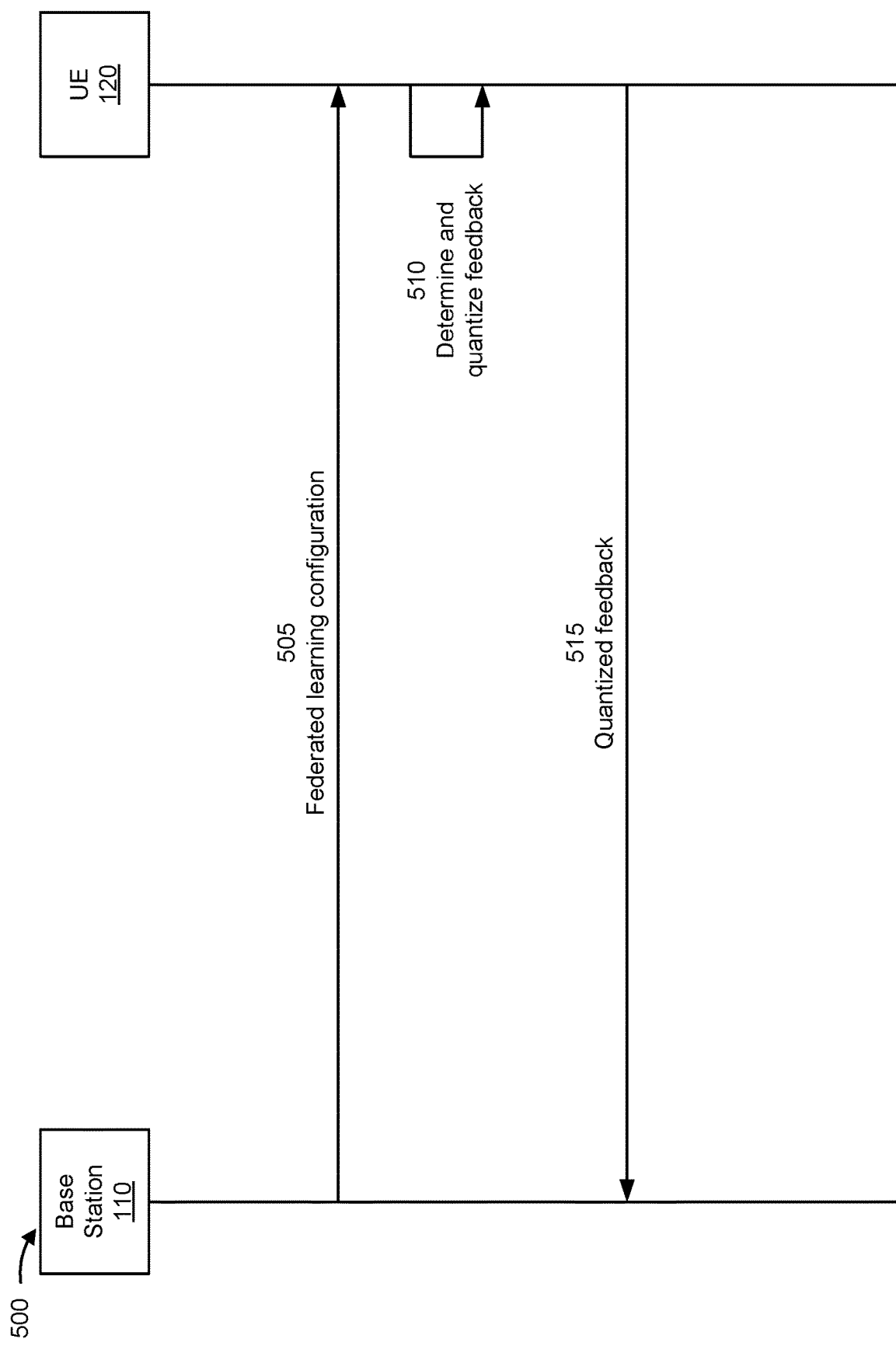
FIG. 5 is a diagram illustrating an example associated with transmitting and receiving non-uniform quantized feedback in federated learning, in accordance with the present disclosure.

FIG. 5 is a diagram illustrating an example 500 of transmitting and receiving non-uniform quantized feedback in federated learning, in accordance with the present disclosure. In example 500, a UE 120 and a base station 110 may communicate with one another. In some aspects, the UE 120 and the base station 110 may communicate using a wireless network, such as wireless network 100 of FIG. 1. Although the description below will focus on the UE 120 and the base station 110, the description similarly applies to other client devices (such as tablets, laptops, desktop computers, and/or other mobile or quasi-mobile devices used for federated learning) and/or to other server devices (such as one or more server computers on a server farm and/or at least a portion of a core network supporting the base station 110), respectively. Although the description herein focuses on one UE 120, the description similarly applies to a plurality of UEs (e.g., UEs 120 of FIG. 3, as described above).

As shown in connection with reference number 505, the base station 110 may transmit, and the UE 120 may receive, a configuration associated with a machine learning component, where the machine learning component accepts one or more inputs to generate one or more outputs. In some aspects, the configuration may be a federated learning configuration. The configuration may be carried, for example, in a radio resource control (RRC) message. The configuration may indicate a machine learning component that includes, for example, at least one neural network model.

As shown in connection with reference number 510, the UE 120 may determine a feedback, associated with the machine learning component, based at least in part on applying the machine learning component. For example, as described above in connection with FIG. 3, the UE 120 may access training data (e.g., stored in a memory of the UE 120, stored in a database accessible to the UE 120, and/or received from the base station 110) and use the training data to determine an input vector (e.g., represented by $x_j$) to be input into the machine learning component to generate a training output (e.g., represented by $y_j$) from the machine learning component. The UE 120 may further use a local loss function (e.g., represented by $F_k(w)$) to determine the feedback based at least in part on the training output $y_j$.

In some aspects, the feedback may include at least one scalar. For example, the feedback may include one or more updated weights for the machine learning component (e.g., associated with one or more nodes of at least one neural network model and/or associated with one or more nodes of at least one decision tree).

Additionally, or alternatively, the feedback may include at least one vector. For example, as described above in connection with FIG. 3, the feedback may include one or more gradients (e.g., represented by $g_k^{(n)} = \nabla F_k(w^{(n)})$) of the loss function F(w) (e.g., determined using an SGD algorithm to optimize the model parameters $w^{(n)}$).

As further shown in connection with reference number 510, the UE 120 may determine a quantized value based at least in part on distances between the feedback and a non-uniform set of quantized digits. For example, the UE 120 may quantize the feedback in order to encode the feedback using fewer bits, which reduces network overhead in transmitting the feedback to the base station. The UE 120 may use non-uniform quantization such that the base station 110 may receive more accurate feedback from the UE 120.

In one example, the UE 120 may select −5, −1, 1, and 5 as the quantized digits such that scalar feedback can be encoded using only two bits. Accordingly, the UE 120 may quantize feedback with a value of 0.6 as 1 based at least in part on a distance of 0.4 between the value of the feedback and the quantized digit of 1. In some aspects, the UE 120 may use non-uniform quantization with randomization. For example, the UE 120 may select −4, −1, 1, and 4 as the quantized digits such that scalar feedback can be encoded using only two bits. Accordingly, the UE 120 may quantize feedback of 2.0 as 1 using a probability of 0.75 (or 75%) based at least in part on a distance of 1.0 between the value of the feedback and the quantized digit of 1, and as 4 using a probability of 0.25 (or 25%), based at least in part on a distance of 2.0 between the value of the feedback and the quantized digit of 4.

In some aspects, the feedback may include a plurality of scalars. Accordingly, the quantized value may be based at least in part on all or some of the plurality of scalars. For example, when the feedback includes a plurality of updated weights, the UE 120 may quantize one of the updated weights, more than one but not all of the updated weights, or all of the updated weights. In some aspects, the UE 120 may use the same non-uniform set of quantized digits for two or more of the plurality of scalars. Additionally, or alternatively, the UE 120 may use different sets of non-uniform quantized digits for two or more of the plurality of scalars.

In some aspects, the feedback may include at least one vector. Accordingly, the quantized value may be based at least in part on one component of the at least one vector. As an alternative, the quantized value may be based at least in part on two or more components of the at least one vector. For example, the UE 120 may quantize some or all components of the at least one vector. In some aspects, the UE 120 may use the same non-uniform set of quantized digits for two or more of the components. Additionally, or alternatively, the UE 120 may use different sets of non-uniform quantized digits for two or more of the components.

In some aspects, the quantized value may be based at least in part on a projection of the at least one vector. For example, when the feedback includes at least one gradient (e.g., as described above), the UE 120 may project the at least one gradient along one or more directions (e.g., using one or more unit vectors along those one or more directions). In some aspects, when the feedback includes a plurality of vectors, the UE 120 may project the plurality of vectors along the same direction. As an alternative, the UE 120 may project at least some of the plurality of vectors along different directions.

In some aspects, the non-uniform set of quantized digits may be based at least in part on a distribution of the feedback. For example, when the feedback includes a plurality of scalars, the UE 120 may adjust the non-uniform set of quantized digits based at least in part on a distribution of the scalars. Accordingly, in one example, the UE 120 may select −4, 1, 0, and 5 as the quantized digits when a cumulative distribution function (CDF) associated with the feedbacks is 0.0 at −1; however, the UE 120 may select −4, −1, 0, and 5 as the quantized digits when a CDF associated with the feedbacks is 0.5 at −1. In another example, when the feedback includes a plurality of vectors, the UE 120 may adjust the non-uniform set of quantized digits based at least in part on distributions of components of the vectors. For example, the non-uniform set of quantized digits used to quantize a first component may depend, at least in part, on a distribution of first components of the vectors. Similarly, the non-uniform set of quantized digits used to quantize a second component may depend, at least in part, on a distribution of second components of the vectors. Although the description of this example focuses on vectors with two components, the description similarly applies to vectors with additional components, such as three components, four components, and so on. In some aspects, the non-uniform set of quantized digits may be based at least in part on a Lloyd algorithm (e.g., as described in connection with FIG. 3). For example, the UE 120 may determine the non-uniform set of quantized digits as centroids of a Voronoi diagram that is based at least in part on the feedback. Accordingly, the feedback may be quantized based at least in part on the centroids. In some aspects, the UE 120 may apply the Lloyd algorithm once or iteratively (e.g., as described in connection with FIG. 3). For example, the UE 120 determine a new non-uniform set of quantized digits, at each iteration, as centroids of a Voronoi diagram that is based at least in part on outputs from the previous iteration.

In some aspects, the quantized value may be based at least in part on applying uniform quantization after applying nonlinear companding using the non-uniform set of quantized digits. For example, the UE 120 may apply a compressor that boosts some values of the feedback and attenuates other values of the feedback. Accordingly, the compressor may use the non-uniform set of quantized digits to determine when to boost and when to attenuate (e.g., in order to bring values closer to corresponding non-uniform quantized digits). The UE 120 may thereafter apply uniform quantization to output from the compressor. In some aspects, the UE 120 may select a nonlinear companding method based at least in part on a distribution of the feedback.

In some aspects, the base station 110 may transmit, and the UE 120 may receive, an indication of a formula and/or other algorithm to use for non-uniform quantization. Although the description herein focuses on a formula, the description similarly applies to other types of algorithms. For example, the configuration described above in connection with reference number 505 may indicate the formula. Additionally, or alternatively, the base station 110 may transmit, and the UE 120 may receive, a separate message (e.g., via RRC signaling) indicating the formula.

In some aspects, the formula may accept values of the feedback as inputs and provide the non-uniform set of quantized digits as outputs. In some aspects, the formula may further accept a distribution of the feedback as input.

In some aspects, the formula may be preconfigured. For example, the formula may be defined in 3GPP specifications and/or another standard. Accordingly, in some aspects, the UE 120 may be programmed (and/or otherwise preconfigured) with the formula. Additionally, or alternatively, the base station 110 may transmit an indication of the formula, from a plurality of preconfigured formulas, for the UE 120 to use. For example, the base station 110 may transmit one or more indices indicating the formula, from a table of formulas in 3GPP specifications and/or another standard, for the UE 120 to use.

Additionally, or alternatively, the base station 110 may transmit, and the UE 120 may receive, an indication of the non-uniform set of quantized digits. For example, the configuration described above in connection with reference number 505 may indicate the non-uniform set of quantized digits. Additionally, or alternatively, the base station 110 may transmit, and the UE 120 may receive, a separate message (e.g., via RRC signaling) indicating the non-uniform set of quantized digits.

In some aspects, the non-uniform set of quantized digits may be preconfigured. For example, the non-uniform set of quantized digits may be defined in 3GPP specifications and/or another standard. Accordingly, in some aspects, the UE 120 may be programmed (and/or otherwise preconfigured) with the non-uniform set of quantized digits. Additionally, or alternatively, the base station 110 may transmit an indication of the non-uniform set of quantized digits, from a plurality of preconfigured sets of non-uniform quantized digits, for the UE 120 to use. For example, the base station 110 may transmit one or more indices indicating the non-uniform set of quantized digits, from a table of sets of non-uniform quantized digits in 3GPP specifications and/or another standard, for the UE 120 to use.

Additionally, or alternatively, the base station 110 may transmit, and the UE 120 may receive, an indication of a nonlinear companding method to apply (e.g., as described above). For example, the configuration described above in connection with reference number 505 may indicate the nonlinear companding method. Additionally, or alternatively, the base station 110 may transmit, and the UE 120 may receive, a separate message (e.g., via RRC signaling) indicating the nonlinear companding method.

In some aspects, the nonlinear companding method may be preconfigured. For example, the nonlinear companding method may be defined in 3GPP specifications and/or another standard. Accordingly, in some aspects, the UE 120 may be programmed (and/or otherwise preconfigured) with the nonlinear companding method. Additionally, or alternatively, the base station 110 may transmit an indication of the nonlinear companding method, from a plurality of preconfigured nonlinear companding methods, for the UE 120 to use. For example, the base station 110 may transmit one or more indices indicating the nonlinear companding method, from a table of nonlinear companding methods in 3GPP specifications and/or another standard, for the UE 120 to use.

As shown in connection with reference number 515, the UE 120 may transmit, and the base station 110 may receive, the quantized value. The base station 110 may determine an update based at least in part on the quantized value. In some aspects, the base station 110 may determine the update based at least in part on aggregating quantized values from a plurality of UEs (e.g., as described in connection with FIG. 3). When the UE 120 uses nonlinear companding, the base station 110 may apply an expander (e.g., an inverse of the compressor) to decode the feedback from the quantized value.

Accordingly, the base station 110 may update the machine learning component based at least in part on the update. In some aspects, the base station 110 may determine a plurality of updates (e.g., based at least in part on aggregating quantized values from multiple sets of UEs, where each set includes one or more UEs) and aggregate the plurality of updates to determine a global update for the machine learning component. In some aspects, example 500 may be recursive, where the base station 110 re-transmits an updated machine learning component for additional training by the UE 120 and/or other UEs in the federated learning.

By using techniques as described in connection with FIG. 5, the UE 120 quantizes the feedback based at least in part on distances between one or more values of the feedback and a non-uniform set of quantized digits. Accordingly, the base station 110 more accurately aggregates feedback from a plurality of UEs including the UE 120. As a result, the UE 120 and the base station 110 experience lower network overhead and memory overhead by using quantization during federated learning without incurring significant loss of accuracy during the federated learning.

As indicated above, FIG. 5 is provided merely as an example. Other examples may differ from what is described with regard to FIG. 5.

Figure 6:
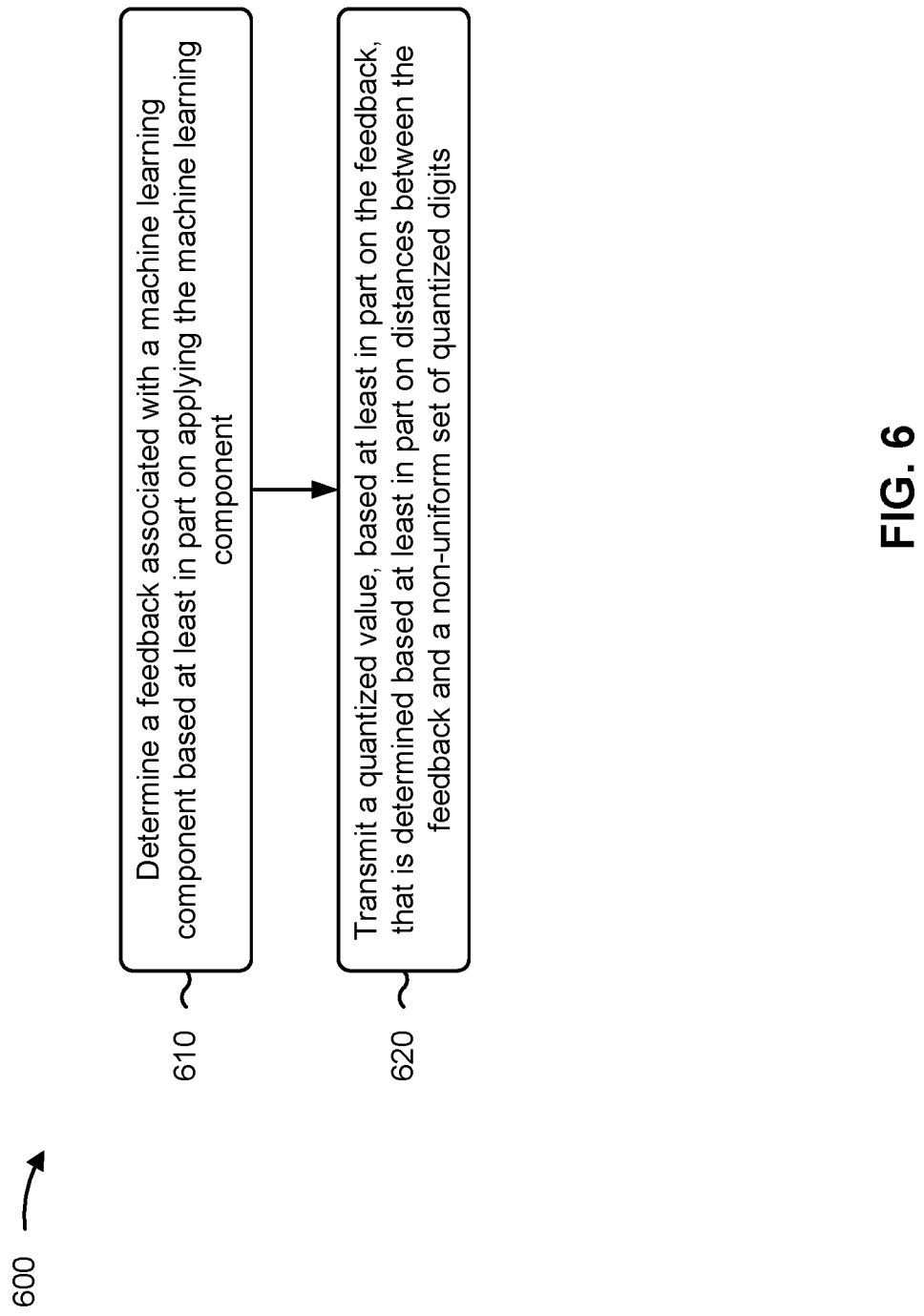
FIGS. 6 and 7 are diagrams illustrating example processes associated with transmitting and receiving non-uniform quantized feedback in federated learning, in accordance with the present disclosure.

FIG. 6 is a diagram illustrating an example process 600 performed, for example, by a client device, in accordance with the present disclosure. Example process 600 is an example where the client device (e.g., UE 120, apparatus 800 of FIG. 8, and/or another client device, such as a tablet, a laptop, or a desktop computer) performs operations associated with transmitting non-uniform quantized feedback in federated learning.

As shown in FIG. 6, in some aspects, process 600 may include determining a feedback associated with a machine learning component based at least in part on applying the machine learning component (block 610). For example, the client device (e.g., using determination component 808, depicted in FIG. 8) may determine a feedback associated with a machine learning component based at least in part on applying the machine learning component, as described herein.

As further shown in FIG. 6, in some aspects, process 600 may include transmitting a quantized value based at least in part on the feedback (block 620). For example, the client device (e.g., using transmission component 804, depicted in FIG. 8) may transmit a quantized value based at least in part on the feedback, as described herein. In some aspects, the quantized value is determined based at least in part on distances between the feedback and a non-uniform set of quantized digits.

Process 600 may include additional aspects, such as any single aspect or any combination of aspects described below and/or in connection with one or more other processes described elsewhere herein.

In a first aspect, the machine learning component comprises at least one neural network.

In a second aspect, alone or in combination with the first aspect, the feedback includes at least one weight.

In a third aspect, alone or in combination with one or more of the first and second aspects, the feedback includes at least one vector.

In a fourth aspect, alone or in combination with one or more of the first through third aspects, the quantized value is based at least in part on one component of the at least one vector.

In a fifth aspect, alone or in combination with one or more of the first through fourth aspects, the quantized value is based at least in part on two or more components of the at least one vector.

In a sixth aspect, alone or in combination with one or more of the first through fifth aspects, the quantized value is based at least in part on a projection of the at least one vector.

In a seventh aspect, alone or in combination with one or more of the first through sixth aspects, the quantized value is based at least in part on applying uniform quantization after applying nonlinear companding using the non-uniform set of quantized digits.

In an eighth aspect, alone or in combination with one or more of the first through seventh aspects, the nonlinear companding is determined based at least in part on a distribution of the feedback.

In a ninth aspect, alone or in combination with one or more of the first through eighth aspects, process 600 further includes receiving (e.g., using reception component 802, depicted in FIG. 8) an indication of the nonlinear companding.

In a tenth aspect, alone or in combination with one or more of the first through ninth aspects, the nonlinear companding is preconfigured.

In an eleventh aspect, alone or in combination with one or more of the first through tenth aspects, the non-uniform set of quantized digits is determined based at least in part on a distribution of the feedback.

In a twelfth aspect, alone or in combination with one or more of the first through eleventh aspects, the non-uniform set of quantized digits is determined based at least in part on a Lloyd algorithm.

In a thirteenth aspect, alone or in combination with one or more of the first through twelfth aspects, process 600 further includes receiving (e.g., using reception component 802) an indication of the non-uniform set of quantized digits.

In a fourteenth aspect, alone or in combination with one or more of the first through thirteenth aspects, the non-uniform set of quantized digits is preconfigured.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
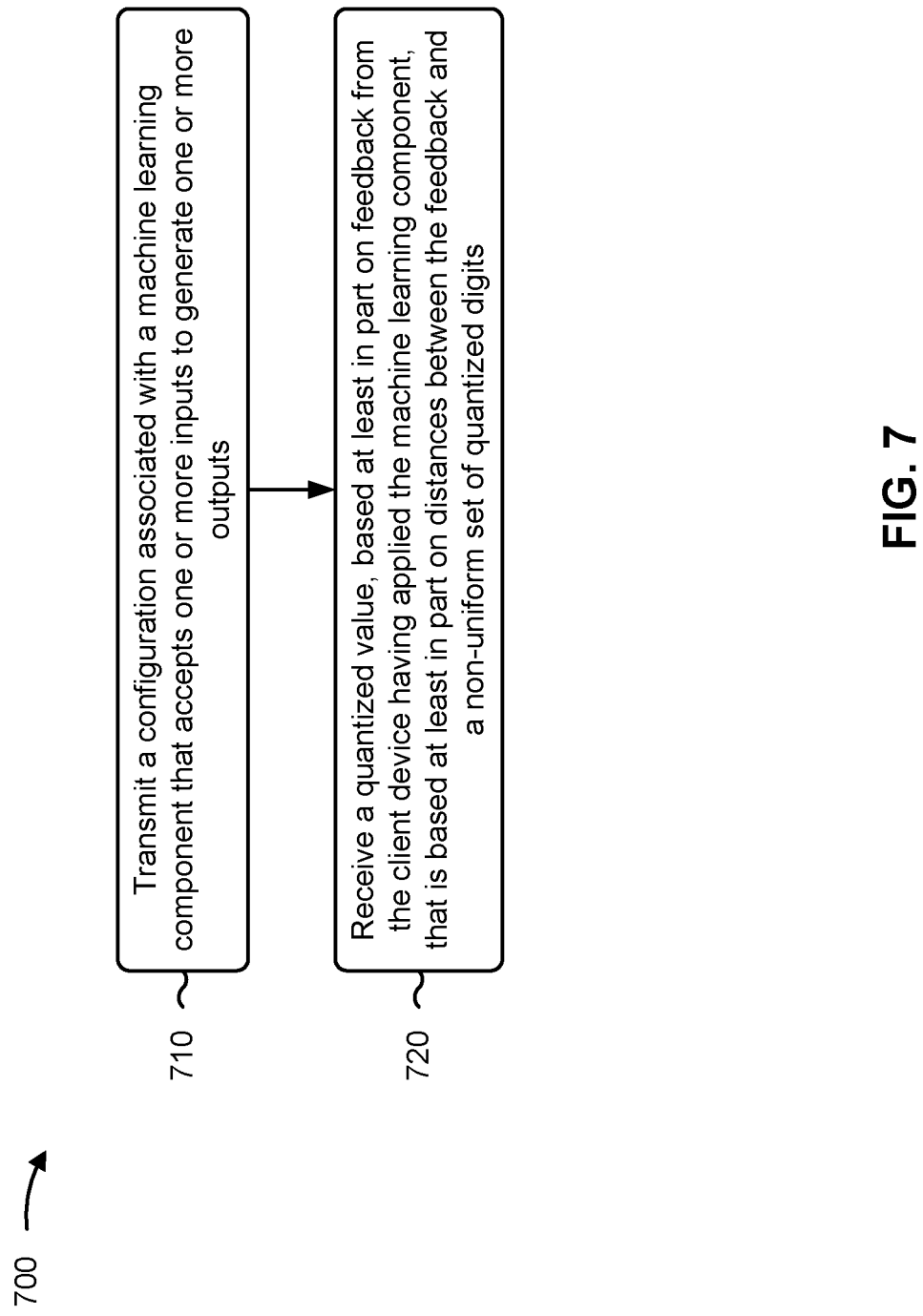

FIG. 7 is a diagram illustrating an example process 700 performed, for example, by a server device, in accordance with the present disclosure. Example process 700 is an example where the server device (e.g., base station 110, apparatus 900 of FIG. 9, and/or another service device, such as one or more server computers in a server farm and/or at least a portion of a core network supporting base station 110) performs operations associated with receiving non-uniform quantized feedback in federated learning.

As shown in FIG. 7, in some aspects, process 700 may include transmitting, to a client device (e.g., UE 120, apparatus 800 of FIG. 8, and/or another client device, such as a tablet, a laptop, or a desktop computer), a configuration associated with a machine learning component (block 710). For example, the server device (e.g., using transmission component 904, depicted in FIG. 9) may transmit, to a client device, a configuration associated with a machine learning component, as described herein. In some aspects, the machine learning component accepts one or more inputs to generate one or more outputs.

As further shown in FIG. 7, in some aspects, process 700 may include receiving a quantized value based at least in part on feedback from the client device having applied the machine learning component (block 720). For example, the server device (e.g., using reception component 902, depicted in FIG. 9) may receive a quantized value based at least in part on feedback from the client device having applied the machine learning component, as described herein. In some aspects, the quantized value is based at least in part on distances between the feedback and a non-uniform set of quantized digits.

Process 700 may include additional aspects, such as any single aspect or any combination of aspects described below and/or in connection with one or more other processes described elsewhere herein.

In a first aspect, the machine learning component comprises at least one neural network.

In a second aspect, alone or in combination with the first aspect, the feedback includes at least one weight.

In a third aspect, alone or in combination with one or more of the first and second aspects, the feedback includes at least one vector.

In a fourth aspect, alone or in combination with one or more of the first through third aspects, the quantized value is based at least in part on one component of the at least one vector.

In a fifth aspect, alone or in combination with one or more of the first through fourth aspects, the quantized value is based at least in part on two or more components of the at least one vector.

In a sixth aspect, alone or in combination with one or more of the first through fifth aspects, the quantized value is based at least in part on a projection of the at least one vector.

In a seventh aspect, alone or in combination with one or more of the first through sixth aspects, the quantized value is based at least in part on applying uniform quantization after applying nonlinear companding using the non-uniform set of quantized digits.

In an eighth aspect, alone or in combination with one or more of the first through seventh aspects, the nonlinear companding is determined based at least in part on a distribution of the feedback.

In a ninth aspect, alone or in combination with one or more of the first through eighth aspects, process 700 further includes transmitting (e.g., using transmission component 904, depicted in FIG. 9) an indication of the nonlinear companding.

In a tenth aspect, alone or in combination with one or more of the first through ninth aspects, the nonlinear companding is preconfigured.

In an eleventh aspect, alone or in combination with one or more of the first through tenth aspects, the non-uniform set of quantized digits is determined based at least in part on a distribution of the feedback.

In a twelfth aspect, alone or in combination with one or more of the first through eleventh aspects, the non-uniform set of quantized digits is determined based at least in part on a Lloyd algorithm.

In a thirteenth aspect, alone or in combination with one or more of the first through twelfth aspects, process 700 further includes transmitting (e.g., using transmission component 904) an indication of the non-uniform set of quantized digits.

In a fourteenth aspect, alone or in combination with one or more of the first through thirteenth aspects, the non-uniform set of quantized digits is preconfigured.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
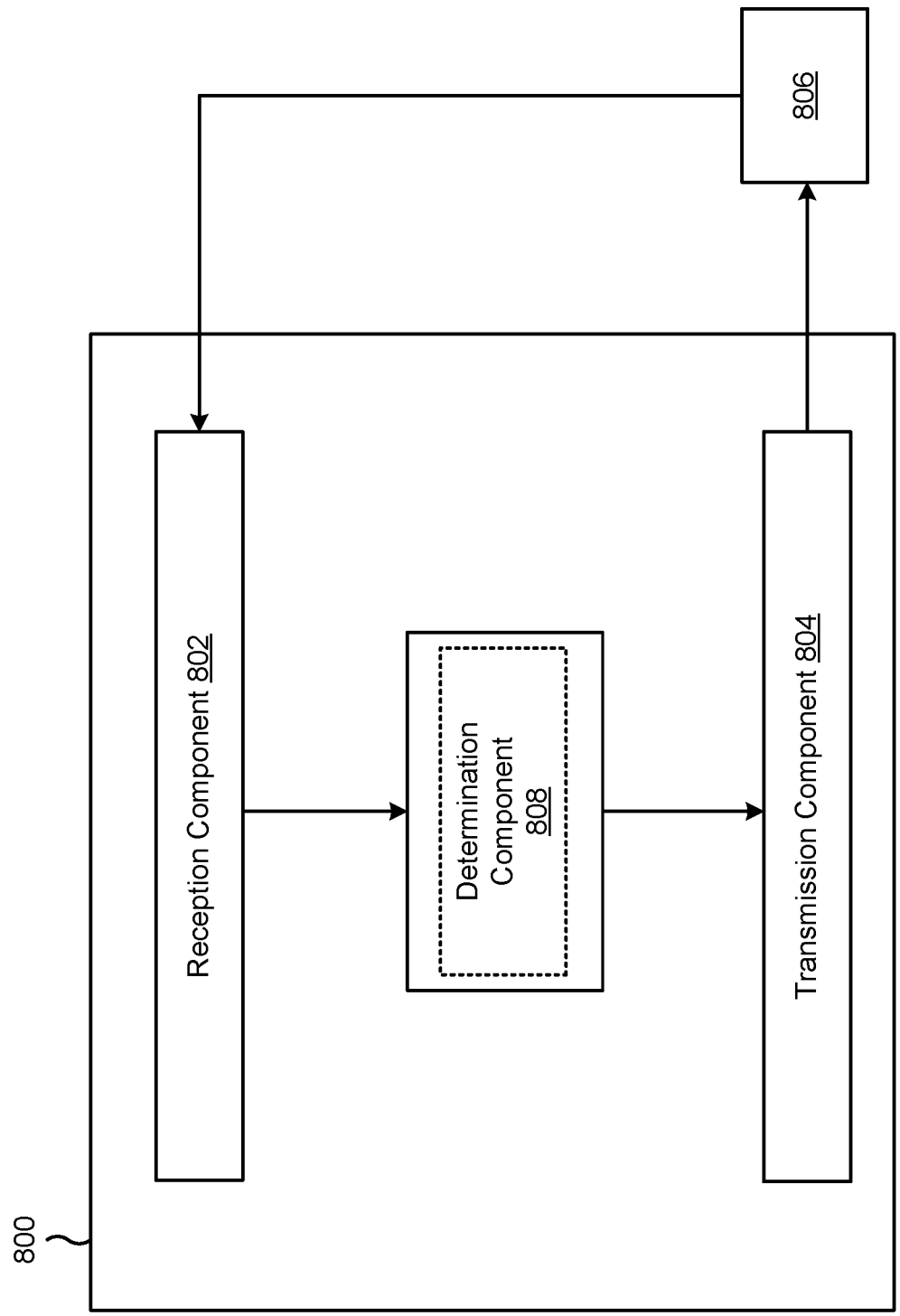

FIG. 8 is a block diagram of an example apparatus 800 for wireless communication. The apparatus 800 may be a client device, or a client device may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a determination component 808, among other examples.

In some aspects, the apparatus 800 may be configured to perform one or more operations described herein in connection with FIGS. 4-5. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

In some aspects, the determination component 808 may determine a feedback associated with a machine learning component based at least in part on applying the machine learning component. In some aspects, the determination component 808 may include a receive processor, a transmit processor, a controller/processor, a memory, or a combination thereof, of the UE described above in connection with FIG. 2. The transmission component 804 may transmit (e.g., to a server device, such as the apparatus 806) a quantized value based at least in part on the feedback. In some aspects, the determination component 808 may determine the quantized value based at least in part on distances between the feedback and a non-uniform set of quantized digits.

In some aspects, the reception component 802 may receive (e.g., from the apparatus 806) an indication of a nonlinear companding that the determination component 808 uses to determine the quantized value. Additionally, or alternatively, the reception component 802 may receive (e.g., from the apparatus 806) an indication of the non-uniform set of quantized digits.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

FIG. 9 is a block diagram of an example apparatus 900 for wireless communication. The apparatus 900 may be a server device, or a server device may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a quantization component 908, among other examples.

In some aspects, the apparatus 900 may be configured to perform one or more operations described herein in connection with FIGS. 4-5. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

In some aspects, the transmission component 904 may transmit (e.g., to a client device, such as the apparatus 906) a configuration associated with a machine learning component that accepts one or more inputs to generate one or more outputs. Accordingly, the reception component 902 may receive a quantized value based at least in part on feedback from the apparatus 906 having applied the machine learning component. In some aspects, the quantized value may be based at least in part on distances between the feedback and a non-uniform set of quantized digits.

In some aspects, the transmission component 904 may transmit (e.g., to the apparatus 906) an indication of a nonlinear companding that the apparatus 906 may use to determine the quantized value. For example, the quantization component 908 may determine the nonlinear companding (e.g., based at least in part on an expected distribution of the feedback). In some aspects, the quantization component 908 may include a receive processor, a transmit processor, a controller/processor, a memory, or a combination thereof, of the base station described above in connection with FIG. 2. Additionally, or alternatively, the nonlinear companding may be preconfigured.

Additionally, or alternatively, the transmission component 904 may transmit (e.g., to the apparatus 906) an indication of the non-uniform set of quantized digits. For example, the quantization component 908 may determine the non-uniform set of quantized digits (e.g., based at least in part on an expected distribution of the feedback). Additionally, or alternatively, the non-uniform set of quantized digits may be preconfigured.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a client device, comprising: determining a feedback associated with a machine learning component based at least in part on applying the machine learning component; and transmitting a quantized value based at least in part on the feedback, wherein the quantized value is determined based at least in part on distances between the feedback and a non-uniform set of quantized digits.

Aspect 2: The method of Aspect 1, wherein the machine learning component comprises at least one neural network.

Aspect 3: The method of any of Aspects 1 through 2, wherein the feedback includes at least one weight.

Aspect 4: The method of any of Aspects 1 through 3, wherein the feedback includes at least one vector.

Aspect 5: The method of Aspect 4, wherein the quantized value is based at least in part on one component of the at least one vector.

Aspect 6: The method of Aspect 4, wherein the quantized value is based at least in part on two or more components of the at least one vector.

Aspect 7: The method of any of Aspects 4 through 6, wherein the quantized value is based at least in part on a projection of the at least one vector.

Aspect 8: The method of any of Aspects 1 through 7, wherein the quantized value is based at least in part on applying uniform quantization after applying nonlinear companding using the non-uniform set of quantized digits.

Aspect 9: The method of Aspect 8, wherein the nonlinear companding is determined based at least in part on a distribution of the feedback.

Aspect 10: The method of any of Aspects 8 through 9, further comprising: receiving an indication of the nonlinear companding.

Aspect 11: The method of any of Aspects 8 through 10, wherein the nonlinear companding is preconfigured.

Aspect 12: The method of any of Aspects 1 through 11, wherein the non-uniform set of quantized digits is determined based at least in part on a distribution of the feedback.

Aspect 13: The method of any of Aspects 1 through 12, wherein the non-uniform set of quantized digits is determined based at least in part on a Lloyd algorithm.

Aspect 14: The method of any of Aspects 1 through 13, further comprising: receiving an indication of the non-uniform set of quantized digits.

Aspect 15: The method of any of Aspects 1 through 14, wherein the non-uniform set of quantized digits is preconfigured.

Aspect 16: A method of wireless communication performed by a server device, comprising: transmitting, to a client device, a configuration associated with a machine learning component, wherein the machine learning component accepts one or more inputs to generate one or more outputs; and receiving a quantized value based at least in part on feedback from the client device having applied the machine learning component, wherein the quantized value is based at least in part on distances between the feedback and a non-uniform set of quantized digits.

Aspect 17: The method of Aspect 16, wherein the machine learning component comprises at least one neural network.

Aspect 18: The method of any of Aspects 16 through 17, wherein the feedback includes at least one weight.

Aspect 19: The method of any of Aspects 16 through 18, wherein the feedback includes at least one vector.

Aspect 20: The method of Aspect 19, wherein the quantized value is based at least in part on one component of the at least one vector.

Aspect 21: The method of Aspect 19, wherein the quantized value is based at least in part on two or more components of the at least one vector.

Aspect 22: The method of any of Aspects 19 through 21, wherein the quantized value is based at least in part on a projection of the at least one vector.

Aspect 23: The method of any of Aspects 16 through 22, wherein the quantized value is based at least in part on applying uniform quantization after applying nonlinear companding using the non-uniform set of quantized digits.

Aspect 24: The method of Aspect 23, wherein the nonlinear companding is determined based at least in part on a distribution of the feedback.

Aspect 25: The method of any of Aspects 23 through 24, further comprising: transmitting an indication of the nonlinear companding.

Aspect 26: The method of any of Aspects 23 through 25, wherein the nonlinear companding is preconfigured.

Aspect 27: The method of any of Aspects 16 through 26, wherein the non-uniform set of quantized digits is determined based at least in part on a distribution of the feedback.

Aspect 28: The method of any of Aspects 16 through 27, wherein the non-uniform set of quantized digits is determined based at least in part on a Lloyd algorithm.

Aspect 29: The method of any of Aspects 16 through 28, further comprising: transmitting an indication of the non-uniform set of quantized digits.

Aspect 30: The method of any of Aspects 16 through 29, wherein the non-uniform set of quantized digits is preconfigured.

Aspect 31: An apparatus for wireless communication at a device, comprising a processor; memory coupled with the processor; and instructions stored in the memory and executable by the processor to cause the apparatus to perform the method of one or more of Aspects 1-15.

Aspect 32: A device for wireless communication, comprising a memory and one or more processors coupled to the memory, the one or more processors configured to perform the method of one or more of Aspects 1-15.

Aspect 33: An apparatus for wireless communication, comprising at least one means for performing the method of one or more of Aspects 1-15.

Aspect 34: A non-transitory computer-readable medium storing code for wireless communication, the code comprising instructions executable by a processor to perform the method of one or more of Aspects 1-15.

Aspect 35: A non-transitory computer-readable medium storing a set of instructions for wireless communication, the set of instructions comprising one or more instructions that, when executed by one or more processors of a device, cause the device to perform the method of one or more of Aspects 1-15.

Aspect 36: An apparatus for wireless communication at a device, comprising a processor; memory coupled with the processor; and instructions stored in the memory and executable by the processor to cause the apparatus to perform the method of one or more of Aspects 16-30.

Aspect 37: A device for wireless communication, comprising a memory and one or more processors coupled to the memory, the one or more processors configured to perform the method of one or more of Aspects 16-30.

Aspect 38: An apparatus for wireless communication, comprising at least one means for performing the method of one or more of Aspects 16-30.

Aspect 39: A non-transitory computer-readable medium storing code for wireless communication, the code comprising instructions executable by a processor to perform the method of one or more of Aspects 16-30.

Aspect 40: A non-transitory computer-readable medium storing a set of instructions for wireless communication, the set of instructions comprising one or more instructions that, when executed by one or more processors of a device, cause the device to perform the method of one or more of Aspects 16-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a client device, the apparatus comprising:
   a memory; and
   one or more processors, coupled to the memory, configured to:
      determine a feedback associated with a machine learning component based at least in part on applying the machine learning component; and
      transmit a quantized value based at least in part on the feedback, wherein the quantized value is determined based at least in part on distances between the feedback and a non-uniform set of quantized digits and based at least in part on applying nonlinear companding utilizing the non-uniform set of quantized digits.

2. The apparatus of claim 1, wherein the machine learning component comprises at least one neural network.

3. The apparatus of claim 1, wherein the feedback includes at least one weight.

4. The apparatus of claim 1, wherein the feedback includes at least one vector.

5. The apparatus of claim 4, wherein the quantized value is based at least in part on one component of the at least one vector.

6. The apparatus of claim 4, wherein the quantized value is based at least in part on two or more components of the at least one vector.

7. The apparatus of claim 4, wherein the quantized value is based at least in part on a projection of the at least one vector.

8. The apparatus of claim 1, wherein the quantized value is based at least in part on applying uniform quantization after applying the nonlinear companding using the non-uniform set of quantized digits.

9. The apparatus of claim 1, wherein the nonlinear companding is determined based at least in part on a distribution of the feedback.

10. The apparatus of claim 1, wherein the one or more processors are further configured to:
receive an indication of the nonlinear companding.

11. The apparatus of claim 1, wherein the nonlinear companding is preconfigured.

12. The apparatus of claim 1, wherein the non-uniform set of quantized digits is determined based at least in part on a distribution of the feedback.

13. The apparatus of claim 1, wherein the non-uniform set of quantized digits is determined based at least in part on a Lloyd algorithm.

14. The apparatus of claim 1, wherein the one or more processors are further configured to:
receive an indication of the non-uniform set of quantized digits.

15. The apparatus of claim 1, wherein the non-uniform set of quantized digits is preconfigured.

16. An apparatus for wireless communication at a server device, the apparatus comprising:
a memory; and
one or more processors, coupled to the memory, configured to:
transmit, to a client device, a configuration associated with a machine learning component, wherein the machine learning component accepts one or more inputs to generate one or more outputs; and
receive a quantized value based at least in part on feedback from the client device having applied the machine learning component, wherein the quantized value is determined based at least in part on distances between the feedback and a non-uniform set of quantized digits and based at least in part on applying nonlinear companding utilizing the non-uniform set of quantized digits.

17. The apparatus of claim 16, wherein the machine learning component comprises at least one neural network.

18. The apparatus of claim 16, wherein the feedback includes at least one weight.

19. The apparatus of claim 16, wherein the feedback includes at least one vector.

20. The apparatus of claim 19, wherein the quantized value is based at least in part on one component of the at least one vector.

21. The apparatus of claim 19, wherein the quantized value is based at least in part on two or more components of the at least one vector.

22. The apparatus of claim 19, wherein the quantized value is based at least in part on a projection of the at least one vector.

23. The apparatus of claim 16, wherein the quantized value is based at least in part on applying uniform quantization after applying the nonlinear companding using the non-uniform set of quantized digits.

24. The apparatus of claim 16, wherein the nonlinear companding is determined based at least in part on a distribution of the feedback.

25. The apparatus of claim 16, wherein the one or more processors are further configured to:
transmit an indication of the nonlinear companding.

26. The apparatus of claim 16, wherein the non-uniform set of quantized digits is determined based at least in part on a distribution of the feedback.

27. The apparatus of claim 16, wherein the non-uniform set of quantized digits is determined based at least in part on a Lloyd algorithm.

28. The apparatus of claim 16, wherein the one or more processors are further configured to:
transmit an indication of the non-uniform set of quantized digits.

29. A method of wireless communication performed by a client device, the method comprising:
determining a feedback associated with a machine learning component based at least in part on applying the machine learning component; and
transmitting a quantized value based at least in part on the feedback, wherein the quantized value is determined based at least in part on distances between the feedback and a non-uniform set of quantized digits and based at least in part on applying nonlinear companding utilizing the non-uniform set of quantized digits.

30. A method of wireless communication performed by a server device, the method comprising:
transmitting, to a client device, a configuration associated with a machine learning component, wherein the machine learning component accepts one or more inputs to generate one or more outputs; and
receiving a quantized value based at least in part on feedback from the client device having applied the machine learning component, wherein the quantized value is based at least in part on distances between the feedback and a non-uniform set of quantized digits and based at least in part on applying nonlinear companding utilizing the non-uniform set of quantized digits.

* * * * *